No. 791,048. PATENTED MAY 30, 1905.
H. A. SHELDON.
SCALE TRUCK AND FRAME.
APPLICATION FILED NOV. 27, 1903. RENEWED APR. 27, 1905.

Witnesses
G. J. Colbourne
A. M. McRae

Inventor
Henry A. Sheldon
by Ridout & Maybee
Atty's

No. 791,048. Patented May 30, 1905.

UNITED STATES PATENT OFFICE.

HENRY A. SHELDON, OF AYLMER, CANADA.

SCALE TRUCK AND FRAME.

SPECIFICATION forming part of Letters Patent No. 791,048, dated May 30, 1905.

Application filed November 27, 1903. Renewed April 27, 1905. Serial No. 257,763.

*To all whom it may concern:*

Be it known that I, HENRY A. SHELDON, of the town of Aylmer, in the county of Elgin, Province of Ontario, Canada, have invented certain new and useful Improvements in Scale Trucks and Frames, of which the following is a specification.

My invention relates to trucks and frames for portable scales. These are usually made with four wheels set outside the frame of the truck. Such a construction possesses two great disadvantages. In the first place the truck must be set on a perfectly plane surface. Otherwise one wheel will be unsupported, and when the scale is loaded the frame is strained and twisted and accurate weighing is impossible. In the second place, unless the wheels are made small bags of grain or other material being weighed are apt to rest or come in contact with them, and so destroy the accuracy of the weighing. If the wheels are made small to prevent this, then the easy-running qualities of the truck when moved are lost.

I secure a truck which will rest on any surface without straining by using three wheels only, and so place the wheels that the truck will not tip when a large portion of the weight is placed on one of the unsupported corners. I secure large main wheels which are out of the way of the material placed on the scale by setting them in pockets formed in the frame, and I secure the advantage of a large swivel-wheel by the use of a peculiar dome-shaped swivel, also set in a pocket in the frame.

My invention also relates to the means of supporting the handle when it is not in use for drawing the truck.

Figure 1:
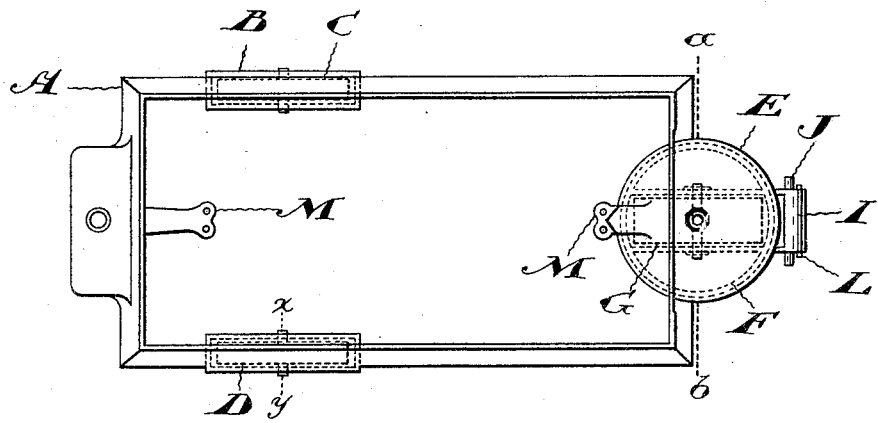
Figure 2:
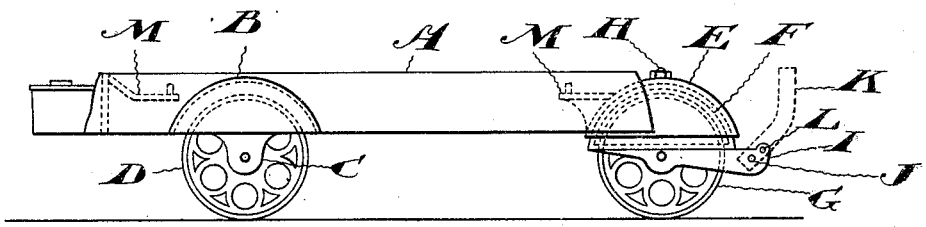
Figures 3, 4, 5:
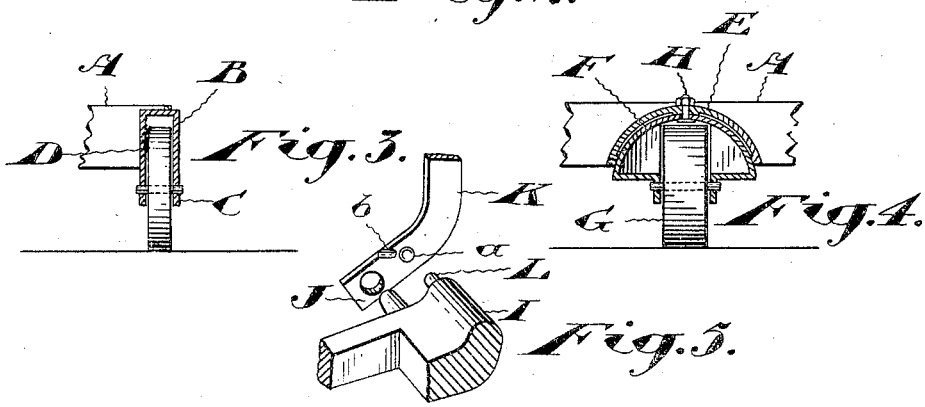

Figure 1 is a plan view of a scale-truck constructed in accordance with my invention. Fig. 2 is a side elevation of the same. Fig. 3 is a section on the line $xy$ in Fig. 1. Fig. 4 is a section on the line $ab$ in Fig. 1. Fig. 5 is a perspective detail showing the method of locking the handle in its out-of-use position.

In the drawings like letters of reference indicate corresponding parts in the different figures.

A is an oblong retangular frame, preferably formed of cast metal of any suitable shape. In each side of the frame, preferably from one-third to one-fourth of the length of the frame from one end, are formed arch-shaped pockets B. Below these pockets on the frame are formed lugs C, in which are journaled the spindles of the main wheels D. In the center of the end of the frame farthest from the main wheels is formed a dome-shaped pocket E. Within this pocket sits the similarly-shaped swivel-frame F, within which is journaled the swivel-wheel G, which, as may be seen from Fig. 1, is broader than the main wheels D. Passing through the center of the top of the pocket and the swivel-frame is a pivot-bolt H. At the lower front edge of the swivel-frame is formed an extension I, having a stud J formed at each side thereof. On these studs is pivoted the forked end of the handle K. Close to each stud J is a small teat L, and in each end of the fork of the handle is formed a depression $a$, the handle having a shallow groove $b$ formed thereon, through which the teat may pass to engage the depression $a$ when the handle is raised. Thus the handle may be held in a raised position when it is not in use for drawing the truck.

M M are brackets cast on the frame, having studs thereon, with which are engaged the braces of the platform of the scale; but as the details of the scale form no part of my present invention they are not shown or described.

From the construction described it may be seen that the wheels are all completely out of the way, so that it is impossible for any material placed on the scale to touch them, and thus interfere with the weighing. They are, further, of large size, making the scale easy of traction.

As only three wheels are employed, the scale will always find a bearing, no matter how uneven the floor may be on which it is used. If an imaginary line be drawn from the center of the outer edge of one of the main wheels to the center of the outer edge of the swivel-wheel, it will be seen that a very small portion of the scale projects outside of the imaginary line, so that a large proportion of the load of the scale may be placed right at one of these corners without tipping up the scale, which is an absolutely essential requirement in a scale-truck and has been the chief reason why four-wheel scale-trucks have been hitherto universally employed.

It will be seen that by my special construction of the swivel-wheel I am enabled to make this wheel as large as the main wheels and at the same time have kept it entirely out of the way.

I find from my particular construction that with larger wheels than ordinarily employed I am enabled to make my truck lower than an ordinary four-wheel scale-truck and still retaining a flush top—that is, none of the wheel pockets or supports extending above the general level of the top of the truck.

The weighing-platform is indicated in Fig. 2.

What I claim as my invention is—

1. A scale-truck having a dome-shaped pocket formed in its frame at one end, in combination with a similarly-shaped swivel-frame set within the pocket; means for holding the swivel-frame in place; and a wheel journaled in the swivel-frame and extending up within the dome-shaped swivel-frame, substantially as described.

2. A scale-truck having a dome-shaped pocket formed in its frame at one end and an arch-shaped pocket at each side, in combination with a similarly-shaped swivel-frame set within the pocket; a pivot-bolt securing the swivel-frame in place; a wheel journaled in the swivel-frame and extending up within it; and wheels journaled on the frame extending up within the arch-shaped pockets, substantially as described.

3. In a scale-truck provided with a swivel-wheel and swivel-frame the combination of a forked handle, studs on the swivel-frame forming pivots for the forked portion of the handle; and teats on the swivel-frame, the ends of the fork of the handle being adapted to spring over and engage the said teats, having slight grooves and depressions formed in them for that purpose, substantially as described.

Aylmer, Ontario, November 16, 1903.

HENRY A. SHELDON.

In presence of—
J. EDW. MAYBEE,
A. M. McRAE.